May 4, 1926.
G. W. VREELAND
1,582,946
APPARATUS FOR HANDLING FLUE DUST
Original Filed Oct. 13, 1921    3 Sheets-Sheet 1
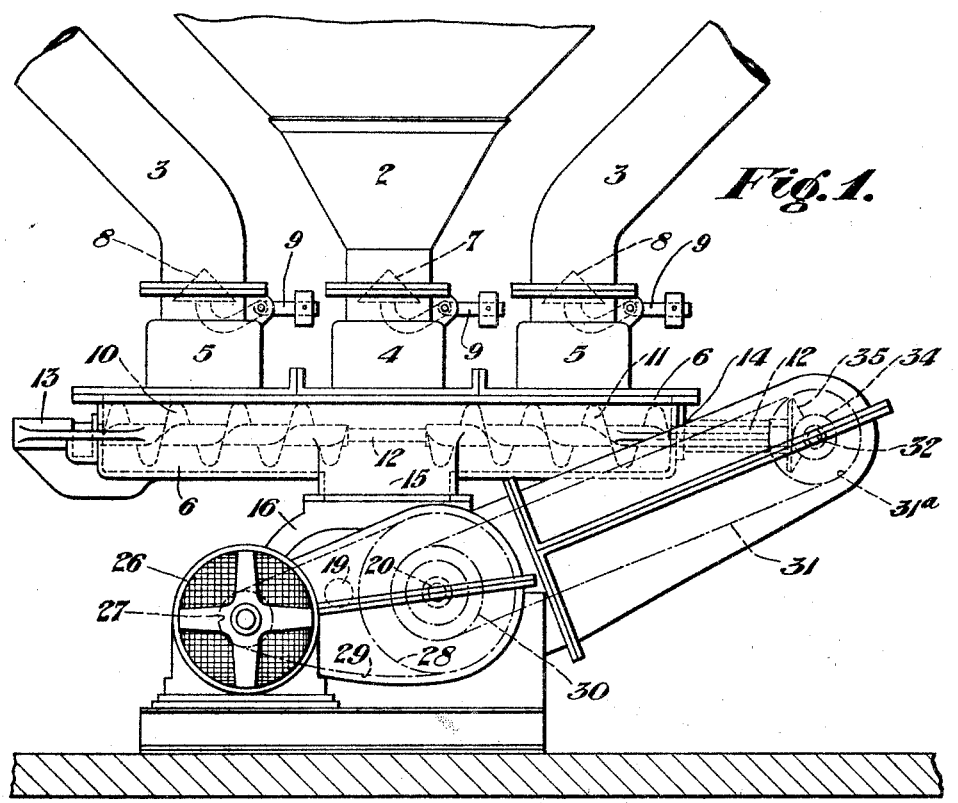
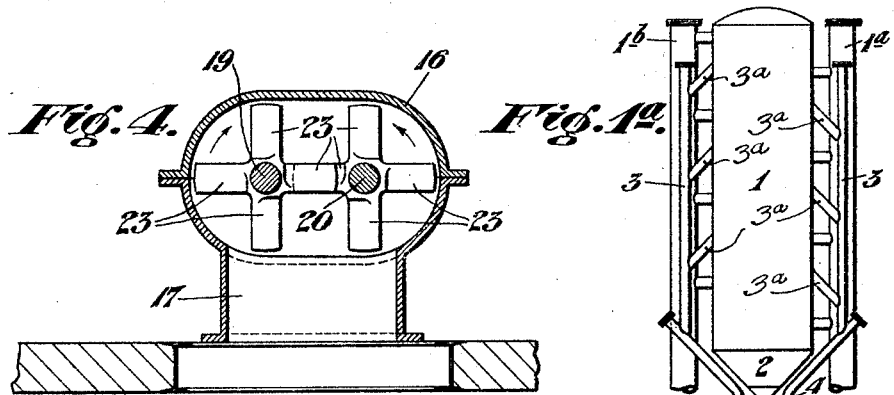
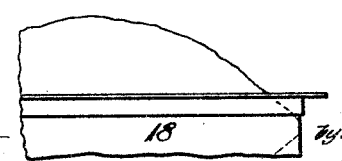
Witnesses:
Edwin Trueb
Inventor:
GEORGE W. VREELAND,
D. Anthony Usina
his Attorney.

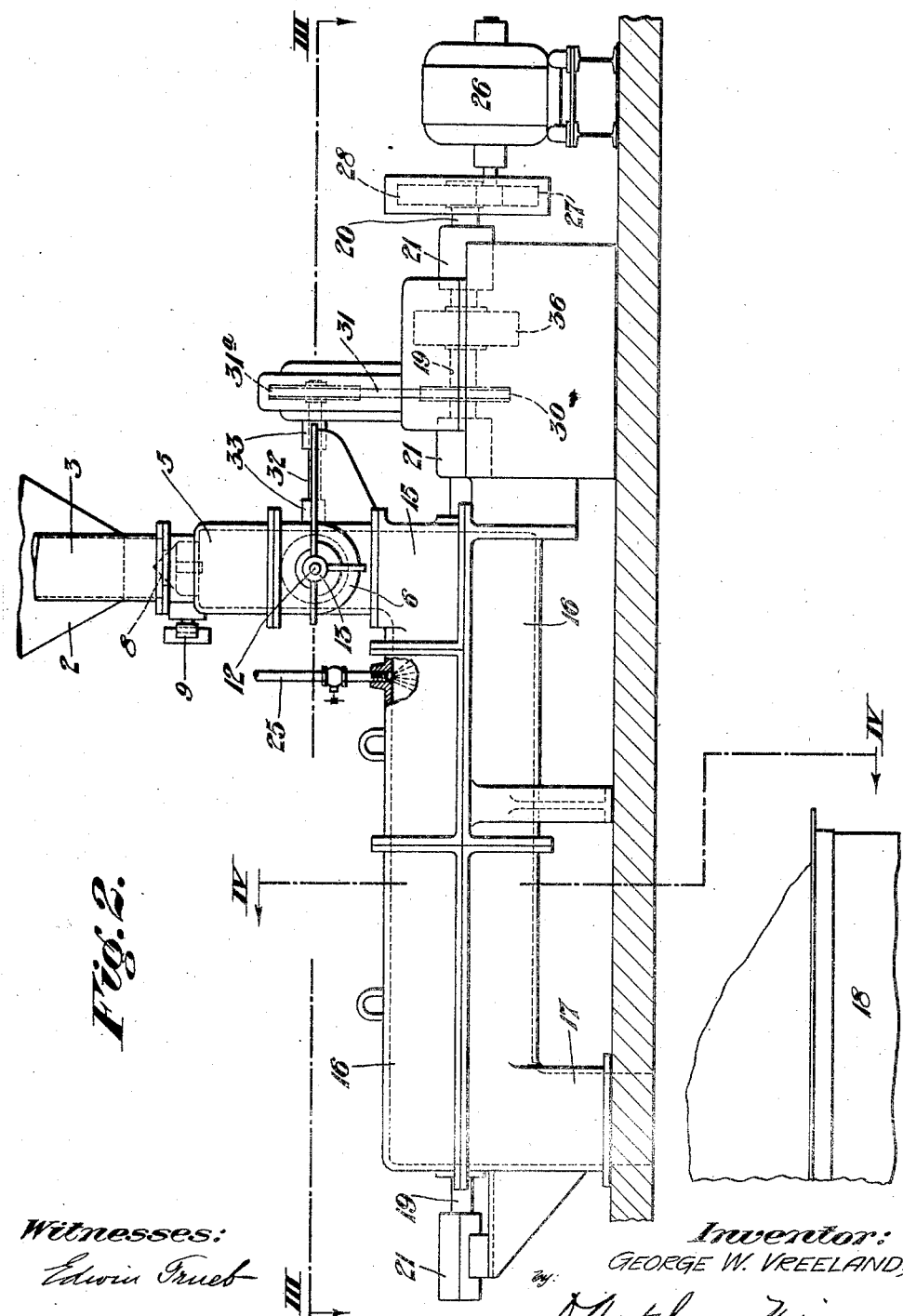

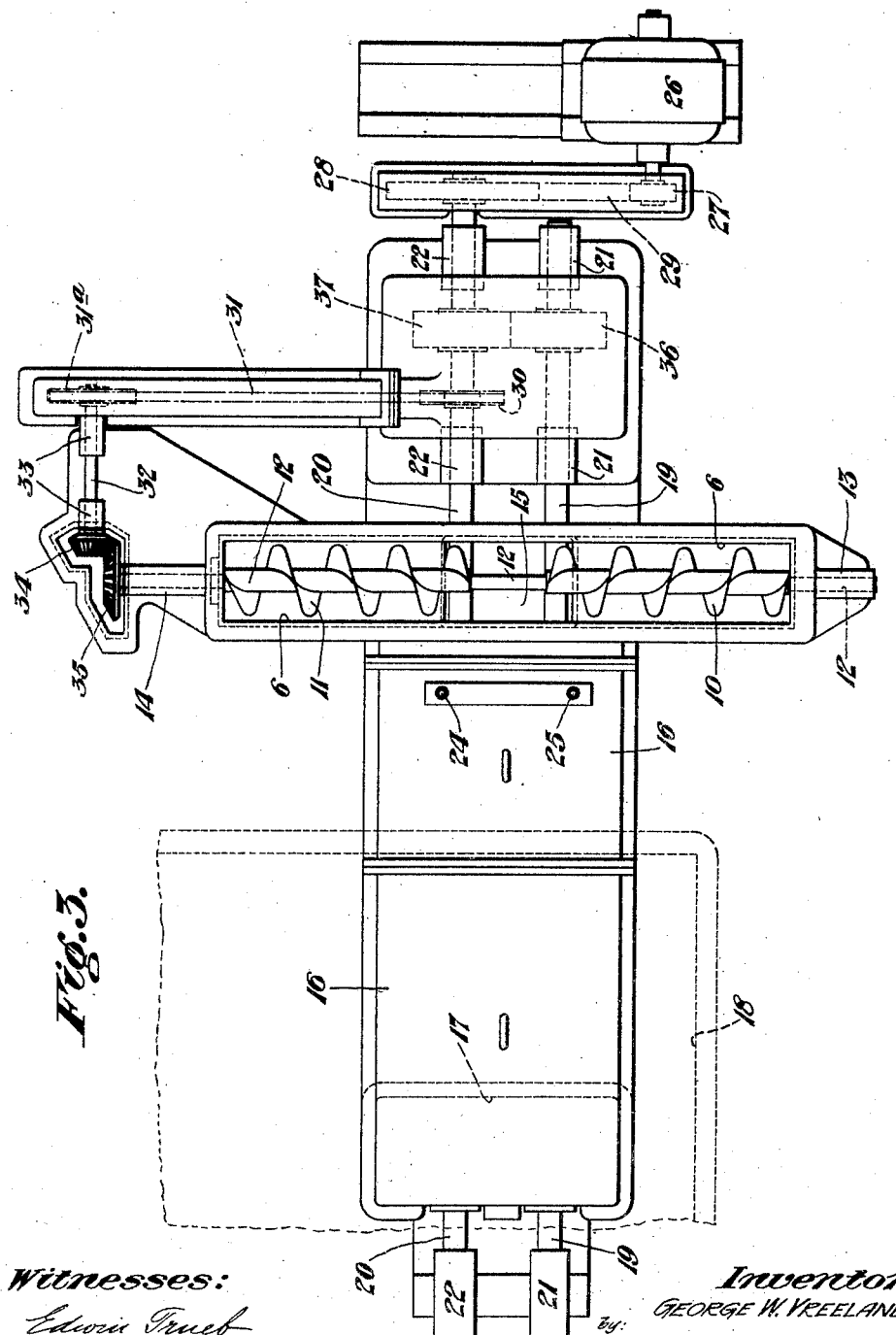

Patented May 4, 1926.

1,582,946

UNITED STATES PATENT OFFICE.

GEORGE W. VREELAND, OF STEUBENVILLE, OHIO.

APPARATUS FOR HANDLING FLUE DUST.

Original application filed October 13, 1921, Serial No. 507,410. Patent No. 1,557,123, dated October 13, 1925. Divided and this application filed September 11, 1925. Serial No. 55,763.

*To all whom it may concern:*

Be it known that I, GEORGE W. VREELAND, a citizen of the United States, and resident of Steubenville, in the county of Jefferson and State of Ohio, have invented certain new and useful Improvements in Apparatus for Handling Flue Dust, of which the following is a specification.

My invention relates to the handling of hot blast furnace flue dust, and while not limited thereto relates more particularly to the handling of hot flue dust as it is discharged from dry gas cleaners and dust catchers, and is a division of my prior application Serial No. 507,410, filed October 13, 1921, which has resulted in Patent No. 1,557,123, dated October 13, 1925.

One object of this invention is to provide a novel apparatus adapted to dampen and cool the hot flue dust as it is discharged from the gas cleaners, thereby facilitating the handling and transportation of said dust.

A further object is to provide the novel combination of apparatus hereinafter described and illustrated in the accompanying drawings.

Heretofore the hot flue dust has been discharged from the gas cleaners and dust catchers into cars or other receptacles, and, due to its finely divided or pulverized form it holds its heat for days. In some instances it is so hot that it will damage the car into which it is dumped. Also, due to its pulverized form it is readily scattered by slight winds and thereby forms a menace to workmen in and around the mill. The present invention eliminates the above disadvantages and provides for the handling of the hot flue dust in a highly improved manner.

Referring now particularly to the drawings, forming part of this specification, Figure 1 is a front elevation of the apparatus for carrying out my improved method applied to the lower end of a dry gas cleaner.

Figure 1$^a$ is a somewhat diagrammatic side elevation of a dry gas cleaner, the lower end of which is shown on a larger scale in Figure 1.

Figure 2 is a side elevation thereof.

Figure 3 is a plan on the line III—III of Figure 2.

Figure 4 is a sectional rear elevation on the line IV—IV of Figure 2.

In the accompanying drawings, 1 designates a dry gas cleaner for removing the flue dust and other foreign matter from hot blast furnace gases. The cleaner 1 is provided with a hopper-like lower end 2 and dust conveying pipes 3. The pipes 3 are provided with branches 3$^a$ which communicate with the several cleaning chambers within the cleaner. A gas inlet main 1$^a$ and a gas outlet main 1$^b$ extend upwardly along the opposite sides of the cleaner to carry the unclean gases to the cleaner and the cleaned gases away from the cleaner. The lower end 2 of the cleaner 1 and the lower ends of the pipes or conduits 3 are connected with suitable inlets 4 and 5, respectively, in a closed dust-proof conveyer casing 6. Suitable bells 7 and 8 are provided in the lower end of the cleaner casing 2 and pipes 3, respectively, each of which has a counterweighted control lever 9 so that they will only open to discharge the dust into the conveyer casing after a predetermined amount has collected or built up above the bells, or said bells may be operated manually at any desired time.

Right and left-hand screw conveyer flights 10 and 11 are mounted on a single conveyer shaft 12 journaled in bearings 13 and 14.

The conveyer casing is provided with a central outlet 15, served by both sets of the conveyer flights 10 and 11, and communicates with an inlet in one end of a closed dust-proof pug mill casing 16.

The pug mill casing 16 is provided with an outlet spout 17 at its opposite end through which the dust is discharged into a car 18 or other receptacle.

A pair of shafts 19 and 20 extend longitudinally within the pug mill casing 16 and are journaled in suitable bearings 21 and 22, respectively.

A plurality of blades or paddles 23 are secured on each of the shafts 19 and 20 for thoroughly mixing the flue dust. The blades or paddles 23 are angularly disposed or twisted so as to move the flue dust lengthwise of the casing 16 as it is mixed and force it to discharge through the discharge spout 17.

A pair of spray pipes 24 and 25 are arranged to enter the pug mill casing 16 adjacent its inlet end so as to spray water upon the dust as it enters the mill.

The conveyer shaft 12 and paddle shafts 19 and 20 are all driven from a single motor 26. The motor 26 is provided with a sprocket 27 which is connected to a sprocket 28 on the shaft 20 by a drive chain 29. A second sprocket 30 is mounted on the shaft 20 and is connected by a drive chain 31 to a sprocket 31ª on a shaft 32 journaled in bearings 33 on a bracket extending from the conveyer casing 6. The shaft 32 is provided with a bevel gear 34 in mesh with a second bevel gear 35 on the end of the conveyer shaft 12 and gears 36 and 37 are mounted on the paddle shafts 19 and 20, respectively, and are in mesh with each other, so that the conveyer shaft 12 and paddle shafts 19 and 20 are driven simultaneously, and the paddle shafts are rotated in opposite directions to each other.

The operation of the above described apparatus is as follows—

The hot blast furnace gases which are laden with flue dust and other foreign matter pass from the main 1ª into the dry gas cleaner 1 where the dust and other foreign matter is removed and the cleaned gases pass out of the cleaner into the main 1ᵇ. The flue dust and pieces of coke, limestone or other foreign matter flow from the cleaner into the conduits or pipes 3 and some also collects in the hopper-like bottom 2 of the cleaner 1. When the flue dust collected in the hopper-like bottom 2 and conduits or pipes 3 becomes sufficient to overcome the counterweighted bells 7 and 8, the bells will open and the collected dust will flow into the conveyer casing 6 and be moved or conveyed toward the central outlet port 15 by the screw conveyer flights 10 and 11 and forced to fall through the port 15 into the pug mill casing 16. As the flue dust enters the pug mill casing 16 it is sprayed with water from the spray pipes 24 and 25 and then thoroughly mixed by the blades or paddles 23 on the shafts 19 and 20 within the pug mill casing, thereby being thoroughly moistened and cooled. The flue dust is conveyed along the pug mill casing and forced to fall through the discharge spout 17 into a car or other receptacle 18 by the blades 23 due to their novel shape.

It will be readily seen that after the finely divided flue dust is thoroughly moistened and cooled it may be readily handled and conveyed from place to place since the particles will adhere sufficiently to each other to prevent it being blown around or scattered by the wind.

It will be understood that the words "dry gas cleaner" as used in the claims may include any mechanism for the separation of flue dust and the like from hot blast furnace gases by dry cleaning, whether by the well known gravity separation methods, filtering, or any other dry method.

I claim:

1. The combination with apparatus for separating flue dust from gases, of a pug mill, means for conveying said dust from said apparatus to said pug mill, means for supplying water to said pug mill, and means for intimately mixing said water and said dust to dampen the dust.

2. The combination with apparatus for separating flue dust from hot blast furnace gases, and a pug mill, of enclosed screw conveyers for conveying said flue dust from said apparatus to said pug mill, means for mixing water with the flue dust in said pug mill, and rotary paddles in said pug mill for intimately mixing said water and said flue dust to cool and dampen the dust in the passage thereof through the pug mill.

3. The combination with a dry gas cleaner adapted to separate flue dust from hot blast furnace gases, of a closed pug mill adapted to receive and intimately mix the flue dust with water to thereby dampen and cool the flue dust.

4. The combination with a dry gas cleaner adapted to separate flue dust from hot blast furnace gases, and having discharge ports for the separated flue dust, of a closed receptacle for receiving said dust, means for supplying water to said receptacle, and power driven means for conveying the flue dust through the receptacle and intimately mixing the flue dust and water to thereby cool the flue dust.

5. The combination with a dry gas cleaner adapted to separate flue dust from hot blast furnace gases, and having discharge ports for the separated flue dust, of an enclosed pug mill, enclosed screw conveyers for conducting the flue dust from said discharge ports to said pug mill, and means for introducing water into said pug mill, said pug mill being adapted to intimately mix the water and flue dust in the passage thereof through the pug mill and thereby rapidly cool the flue dust.

In testimony whereof, I have hereunto set my hand.

GEORGE W. VREELAND.